United States Patent
Böhm

(10) Patent No.: US 6,554,108 B1
(45) Date of Patent: Apr. 29, 2003

(54) METHOD AND DEVICE FOR MONITORING THE MOVEMENTS OF AN ACTUATOR

(75) Inventor: Jürgen Böhm, Oberneisen (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/830,445

(22) PCT Filed: Oct. 27, 1999

(86) PCT No.: PCT/EP99/08125

§ 371 (c)(1),
(2), (4) Date: Apr. 25, 2001

(87) PCT Pub. No.: WO00/25036

PCT Pub. Date: May 4, 2000

(30) Foreign Application Priority Data

Oct. 27, 1998 (DE) .......................... 198 49 413
Mar. 8, 1999 (DE) .......................... 199 10 048

(51) Int. Cl.$^7$ ............................................. F16D 66/00
(52) U.S. Cl. ............................. 188/1.11 E; 303/122.05
(58) Field of Search ........................ 188/1.11 E, 1.11 W, 188/1.11 L, 1.11 R; 340/453, 454; 303/122.03, 122.05, 122.08

(56) References Cited

U.S. PATENT DOCUMENTS

| | | | |
|---|---|---|---|
| 4,749,063 A | * | 6/1988 | Garrett et al. ........... 188/1.11 E |
| 4,995,483 A | | 2/1991 | Moseley et al. |
| 5,939,978 A | * | 8/1999 | Kyrtsos ................... 188/1.11 L |
| 5,975,250 A | * | 11/1999 | Brandmeier et al. .... 188/1.11 E |
| 6,276,494 B1 | * | 8/2001 | Ward et al. ............. 188/1.11 L |
| 6,408,989 B2 | * | 6/2002 | Kramer ................... 188/1.11 L |
| 6,411,206 B1 | * | 6/2002 | Weant et al. ........... 188/1.11 E |

FOREIGN PATENT DOCUMENTS

| | | |
|---|---|---|
| DE | 34 44 301 | 6/1986 |
| DE | 195 34 854 | 3/1997 |
| DE | 195 36 694 | 4/1997 |
| DE | 195 36 695 | 4/1997 |
| DE | 196 29 936 | 11/1997 |
| DE | 196 25 400 | 12/1997 |
| EP | 0 849 866 | 6/1998 |

* cited by examiner

Primary Examiner—Christopher P. Schwartz
Assistant Examiner—Melanie Torres
(74) Attorney, Agent, or Firm—Rader, Fishman & Grauer PLLC

(57) ABSTRACT

A method of monitoring the motion of an actuator of a vehicle brake including establishing an actuator reference coordinate which is associated with a predetermined actuator reference position, defining an actuator actual coordinate in accordance with the actuator reference coordinate and in accordance with the motion of the actuator, establishing a first permitted actuator motion range from a permitted release end coordinate of the actuator for release of the brake and a first permitted brake application end coordinate of the actuator for application of the brake in accordance with the actuator reference coordinate and outputting a signal when the actuator actual coordinate lies outside the first permitted actuator motion range.

19 Claims, 6 Drawing Sheets

METHOD AND DEVICE FOR MONITORING THE MOVEMENTS OF AN ACTUATOR

TECHNICAL FIELD

The present invention generally relates to monitoring devices and more particularly relates to a method and a device for monitoring the motion of an actuator of a vehicle brake.

BACKGROUND OF THE INVENTION

DE 197 14 046 A1 discloses an electromechanically operated wheel brake wherein an electric motor drives a rotating spindle. By way of a translatory movement of the spindle induced thereby, the brake is actuated by displacement of the brake linings against the brake disc or brake drum. In this arrangement, the spindle can move only within a fixed mechanical range.

This range results from the constructive design of brake mechanics which is normally rated so that the brake linings can be set or readjusted within a range of readjustment corresponding to lining wear in their initial position (release position). The setting is effected so that the brake linings are at a given distance from, i.e., have a clearance to, the brake disc or brake drum. In the other direction, the mechanical range is rated so that lining replacement is easily possible when needed (i.e. the spindle can be withdrawn to a sufficient extent in the direction of release of the brake).

To prevent the spindle from moving into abutment on the mechanical stop during operation and, on the other hand, to recognize the necessity of lining replacement in due time, the relative drive or spindle movement can be monitored.

An object of the present invention is to provide a method and a device for monitoring the motion of an actuator of a vehicle brake by which monitoring with respect to an absolute vehicle position is possible.

To monitor the spindle movement, magnets can be fitted to the driving engine shaft in an evenly spread fashion which produce pulses when passing a Hall sensor fitted at an appropriate location. These pulses are used to determine e.g. the course angle of the engine shaft relative to a previously defined reference position. From this value, in turn, the translatory movement of the spindle can be inferred by way of the transmission ratio between spindle rotation and spindle translation. The reference position for this position measuring system which performs relative and incremental measurement is fixed by zero point initialization, and changes of the course angle compared to this reference position are reviewed by counting the pulses produced by the position measuring system. Usually, the position of the drive shaft or of the spindle serves as a reference position, during which the brake linings are in straight (i.e., force-free) abutment on the brake disc or brake drum. The direction of motion of the drive can be sensed in addition by an appropriately installed second Hall sensor. In this case, it applies in general to the counting direction that a mathematically positive angular variation implies a movement of the driving shaft in the direction of brake application, and a negative angular variation means a movement in the direction of release of the brake.

However, the above system is a position measuring system with relative measurement, which determines spindle positions only relatively, without knowing which absolute position within the limited mechanical motion range the spindle presently adopts.

Therefore, the following steps, the sequence of which is not determined herein, will be performed according to the present invention: establishing an actuator reference coordinate associated with a predetermined actuator reference position, determining an actuator actual coordinate in accordance with the actuator reference coordinate and in accordance with the motion of the actuator, establishing a first permitted actuator motion range based on a permitted release end coordinate of the actuator for release of the brake and a first permitted brake application end coordinate of the actuator for application of the brake in accordance with the actuator reference coordinate and issuing of a signal, when the actuator actual coordinate is outside the first permitted actuator motion range.

The term 'actuator' may refer to a moving part for actuation of the brake. The moving part may e.g. be a motor shaft or a spindle. The actuator is driven preferably electrically. The actuator position can be sensed rotatorily and translatorily, however, it is preferred that it is sensed rotatorily e.g. by means of a Hall sensor or a resolver. The given actuator reference position is a fixed position which the actuator may assume in a defined manner. That means, this position is an absolute position within the vehicle, preferably, within the vehicle brake and can, thus, be always reassumed.

A switching sensor element such as a microswitch or a switching Hall sensor, which can sense the translatory position of the spindle, can be used to find the actuator reference position. When the actuator reaches the actuator reference position predetermined by the sensor element, it will issue a switching pulse or switch from the logical condition "0" into the logical condition "1", for example. To adopt this position, the actuator preferably moves at a low speed in the direction of release of the brake until the sensor element signals that the position is reached, e.g. by the switching pulse.

Another possibility of finding the actuator reference position, without the need of fitting an additional sensor element in the brake, may include predefining the mechanical stop of the actuator on the engine housing, preferably in the direction of release of the brake, as actuator reference position. To adopt this position, the actuator may preferably move at a very low speed in the direction of release of the brake. The engine current that drives the actuator, for example, will be sensed during this movement. When the actuator moves against the engine housing, the engine current will rise significantly because the engine operates in opposition to a system with a very high amount of rigidity in this case. This current rise permits detecting that the actuator reference position is reached and terminating the movement of the actuator.

A related actuator reference coordinate can be established at a given actuator reference position. This can be done in that allocated to a counter, which is also used to determine the actuator actual coordinate, is a value which can be stored in a memory, or input from externally and stored subsequently. This value may equal zero so that the counter is e.g. simply reset or initialized again. Another possibility of establishing the actuator reference coordinate includes storing the value which is in the counter when the actuator reference position is reached as actuator reference coordinate. Attention should be paid, if necessary, when the actuator reference coordinate is established that, depending on the status of the actuator reference position, the counter starting from the reference coordinate is in a position to count up and down and produces utilizable values.

Further, a first permitted actuator motion range can be established within which the actuator is allowed to move.

This permitted motion range can refer to the position of the actuator or to the related coordinate because one can be determined by the respectively other one. This first actuator motion range is confined by two permitted coordinates, that is, by a permitted release end coordinate in the direction of release of the brake, and by a first permitted brake application end coordinate in the direction of application of the brake, the respective end coordinates pertaining to corresponding actuator end positions. The first permitted actuator motion range is established in accordance with the actuator reference coordinate and, thus, also in accordance with the actuator reference position. Thus, a motion range is established which has an absolute reference to the actuator reference position.

The above-described method steps can be performed in a service brake in each case when a vehicle is started. The corresponding coordinates can be stored and polled again at any time. In a parking brake, these steps can be performed when the brake is released which must be possible also during travel of the vehicle. This can be done e.g. after first release of the brake after start of travel. For safety reasons, these steps can also be performed several times during continued operation of the vehicle to check whether the coordinates found now as before are coincident with the related positions. Thus, the actuator reference position can be assumed, and the actuator actual position can be compared with the actuator reference coordinate. A correction may become necessary due to wrong sensor pulses or a faulty transmission of the pulses (e.g. too many or too few pulses).

The proper monitoring of the motion of the actuator can be effected in that an actuator actual coordinate is continuously determined as a function of the motion of the actuator. The actuator actual coordinate and/or the actuator motion direction can be determined or detected by using an incremental position measuring system of relative measurement. This determination can take place in that the counter, starting from the actuator reference coordinate, counts up or down the pulses of a Hall sensor installed at an appropriate location, depending on the direction of motion of the actuator. The direction of motion can be detected by using an appropriately installed second Hall sensor.

The current actuator actual coordinate can be compared with the permitted release end coordinate and the first permitted brake application end coordinate, possibly, by taking into account the direction of motion of the actuator to find out whether the actuator actual coordinate lies outside the first permitted actuator motion range. If this is the case, a corresponding signal will be issued.

The signal can be used to send an alarm to the driver. When the actuator actual coordinate exceeds the first permitted actuator motion range in the direction of release, this can be regarded as a malfunction of the engine because there might be the risk in this case that the spindle moves against the engine housing. To prevent this action, the actuator release motion can be stopped in addition to the output of the alarm. After the release movement of the actuator is terminated, several subsequent actions are possible such as a new initialization or deactivation of the brake, etc.

When the actuator actual coordinate exceeds the first permitted actuator motion range in the direction of brake application, an alarm can also be sent to the driver indicating, for example, that brake lining replacement is necessary.

Preferably, the permitted release end coordinate and the first permitted brake application end coordinate are established with respect to the maximum possible mechanical actuator motion range, that means, they can be so established that the spindle will not move against the mechanical stop in the direction of release and will not move so far in the direction of brake application that in the extreme case the metal of the brake shoe will bear against the metal of the brake disc or brake drum, if brake linings no longer exist. Besides, corresponding safety distances can be taken into consideration.

DETAILED DESCRIPTION OF THE PREFERRED EMBODIMENTS

Figure 1:
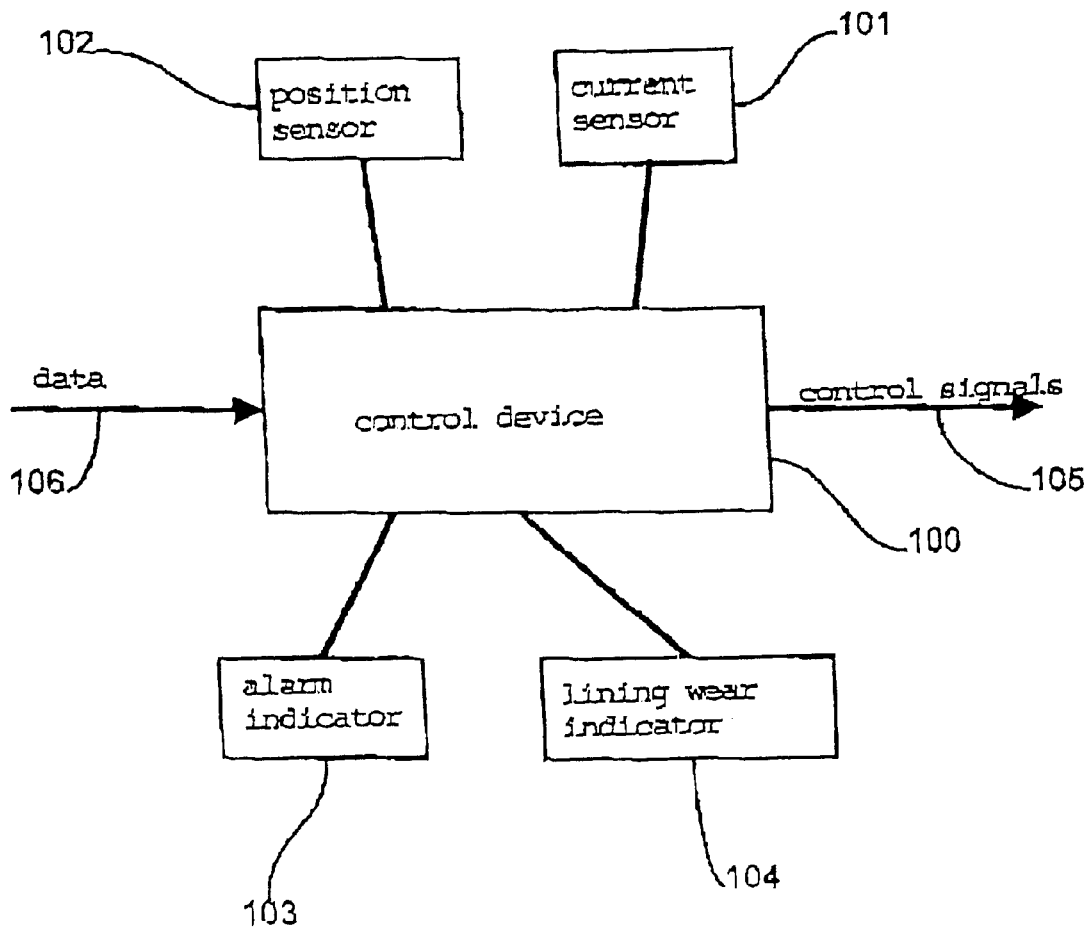
FIG. 1 is a block diagram of an embodiment of the device of the present invention.
Figure 3A:
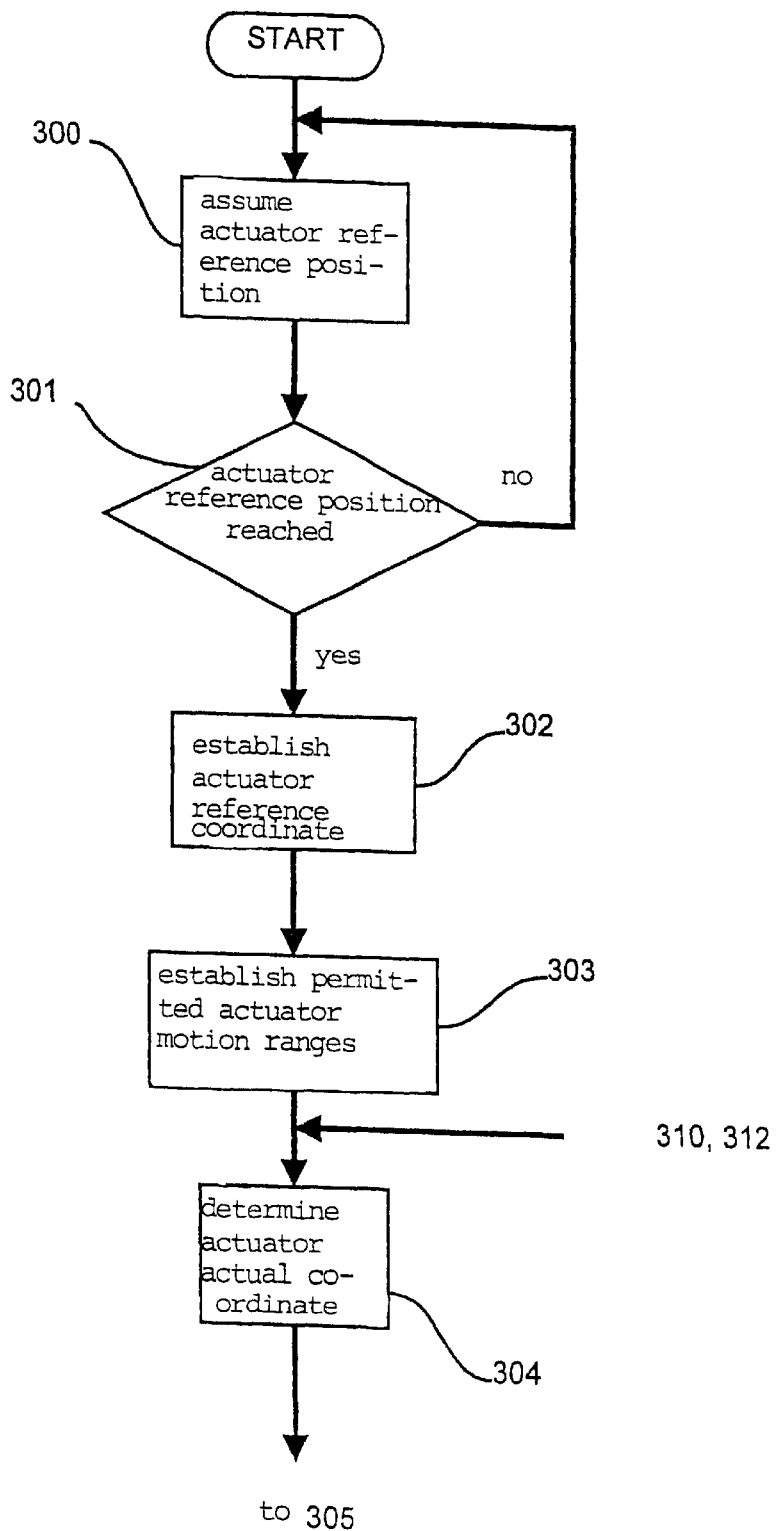
FIG. 3 is a flow chart of an embodiment of the method of the present invention.
Figure 3B:
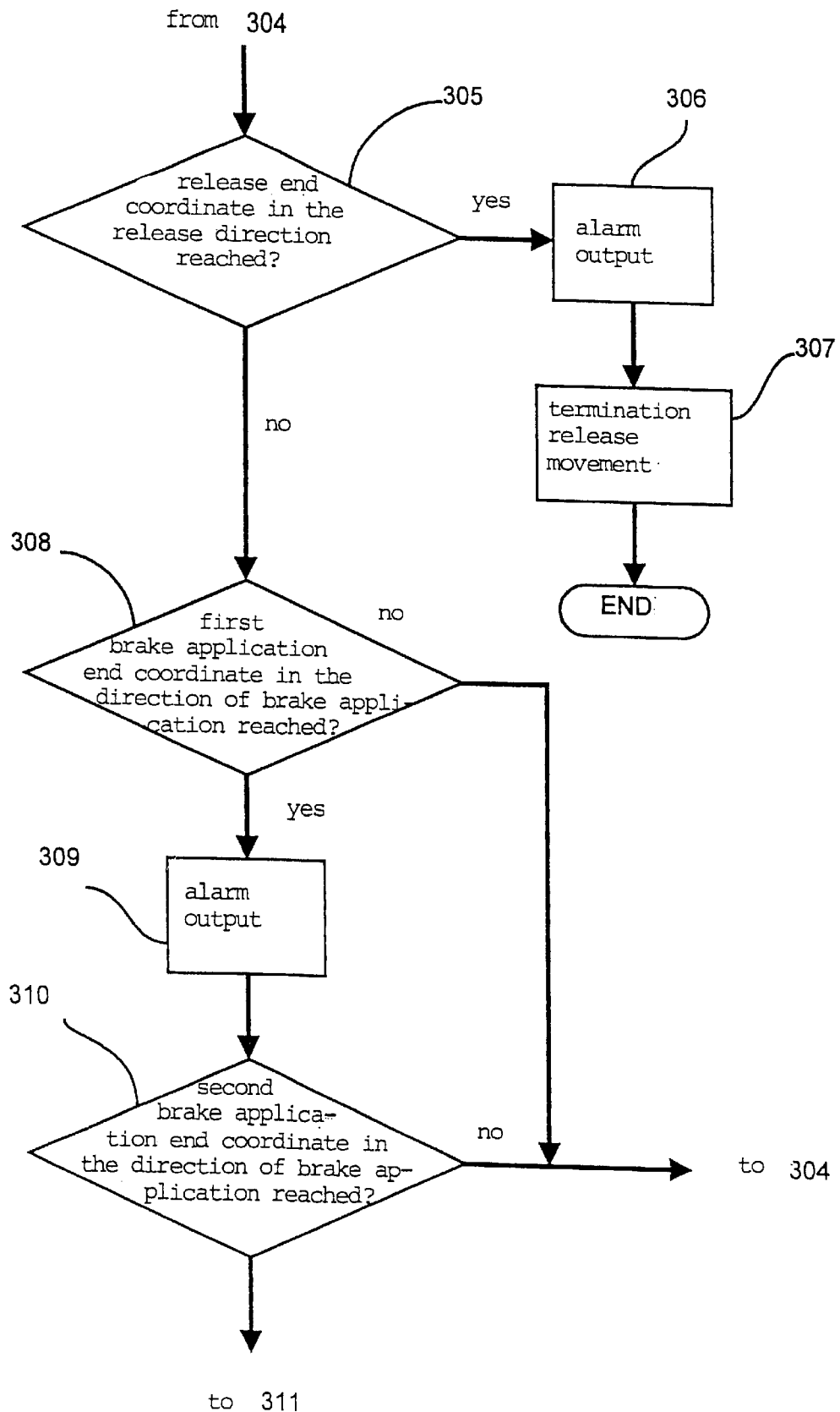
Figure 3C:
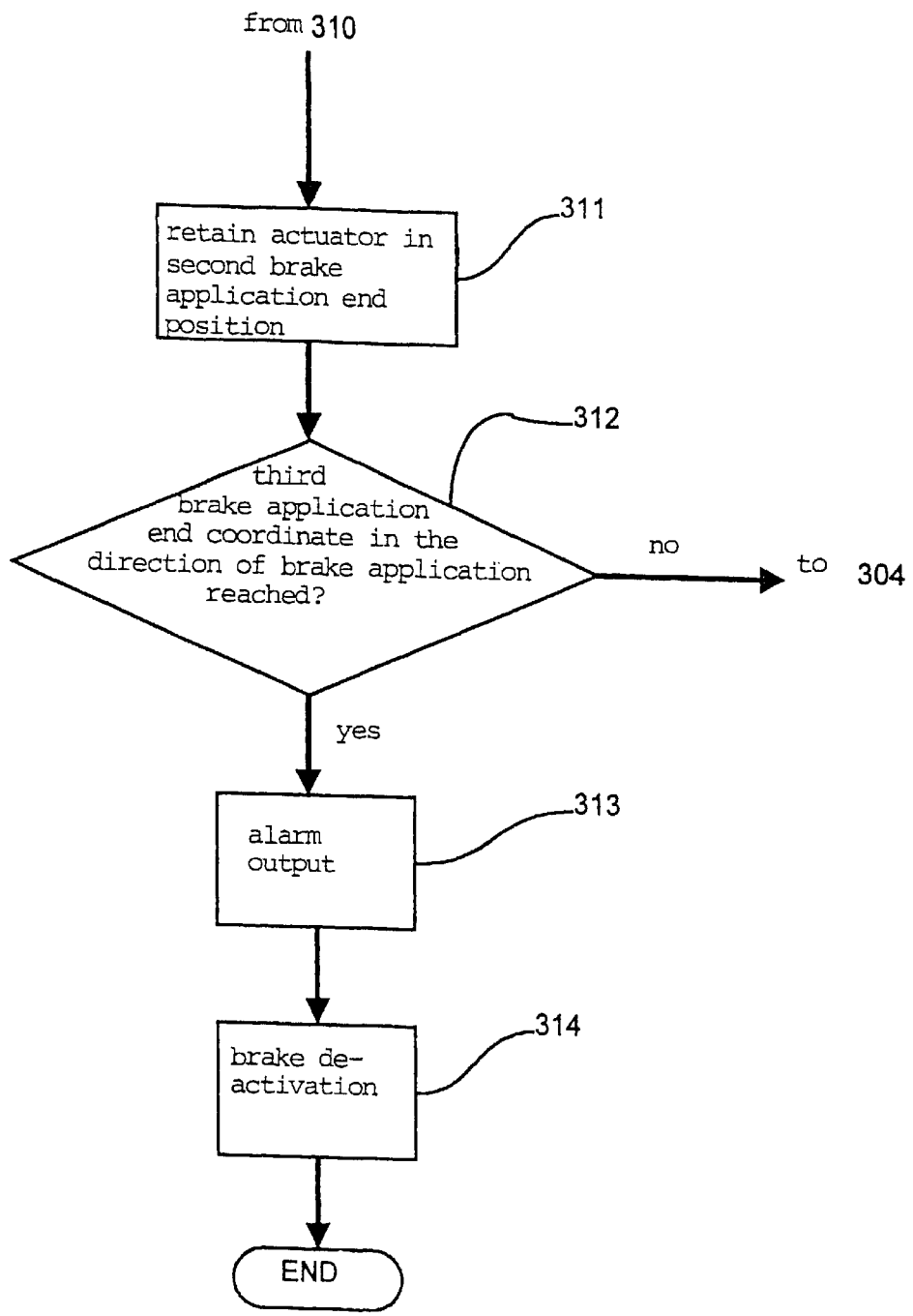
Figure 4:
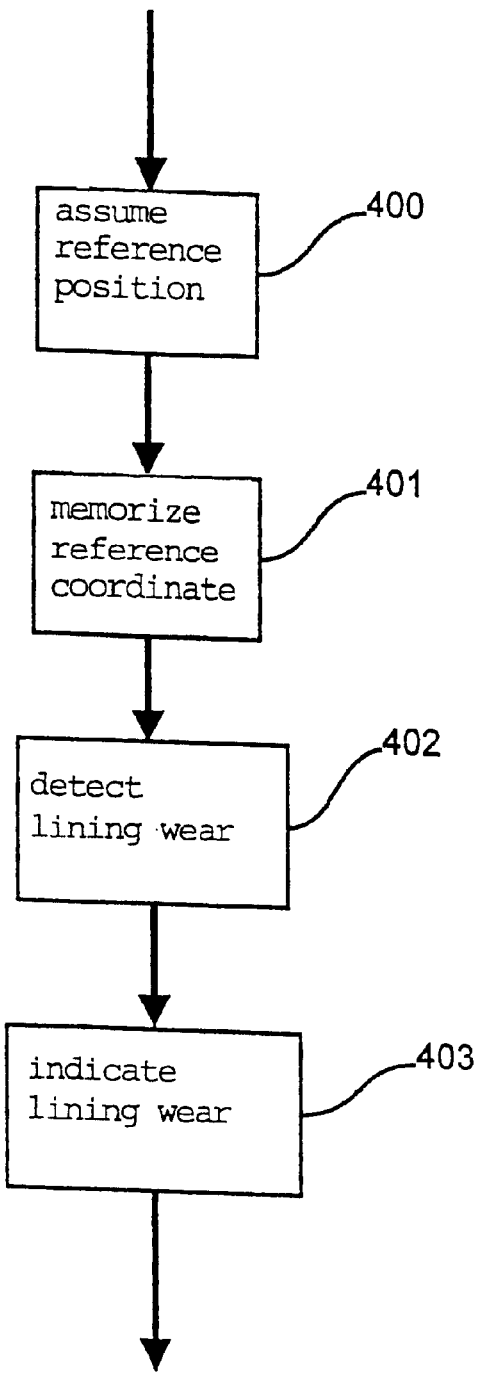
FIG. 4 is a flow chart of another embodiment of the method of the present invention.

FIG. 1 shows an exemplary embodiment of a control device 100 of the present invention which can be a microprocessor, for example, configured to perform the steps in FIGS. 3 and 4. Device 100 has an input 106 e.g. for data input. By this, the actuator reference coordinate can be input which can be assigned by the actuator to a counter comprised in the control device 100 when the actuator reference position is reached. Further, the maximum possible mechanical end positions of the maximum possible mechanical motion range can be input with respect to the actuator reference position, from which, in turn, the end coordinates can be determined. Also, signals of other devices can be input by way of input 106 for processing in the control device 100.

The control device 100 controls the actuator motion, for example, by outputting control signals through output 105. Device 100 is connected to a current sensor 101 which senses the engine current that is used to drive the actuator. When the actuator has reached the actuator reference position, i.e., the mechanical stop of the spindle on the engine housing, for example, the current sensor 101 will signal a significant current rise to the control device 100. The latter knows in this event that the actuator has reached the reference position and may then assign the corresponding actuator reference coordinate, which e.g. was input by way of input 106, to the counter.

During motion of the actuator, a position sensor 102 passes pulses to the control device 100 which the counter uses for counting. Either the position sensor 102 can furnish an information about the direction of motion of the actuator, or the control device 100 can receive this information in another way.

Further, the control device 100 determines the first permitted actuator motion range with respect to the actuator reference coordinate, e.g., by using input end positions. The permitted release end coordinate and the first permitted brake application end coordinate can be stored in a memory within the control device 100 so that they can be polled any time. Provided the actuator reference coordinate is input by way of input 106, it is, however, also possible to also input the previously established end coordinates through this input 106. This could happen one time during initialization and need not be repeated then. This possibility is e.g. advisable when the actuator motion range is established as a function of the mechanically possible motion range of the actuator because in this case the actuator reference position and the mechanical motion range are known already in advance. In this event, the actuator reference coordinate and the end coordinates can be determined one time already in advance.

A comparison device can be provided in the control device 100 to compare the actuator actual coordinate with the release end coordinate and the first brake application end coordinate and, possibly, further coordinates, whereupon the control device 100 can find out whether the actuator actual coordinate lies outside the first permitted actuator motion range. If this is the case, the control device will output a corresponding signal. This signal can be sent to the warning indicator 103, which can warn audibly and/or visually, and/or also tactilely, on the one hand, and to the lining wear indicator 104 as a function of the comparison between the actuator actual coordinate and the first permitted actuator motion range, on the other hand. The warning indicator can be subdivided into single ranges which react to different signals of the control device to be able to indicate to the driver, for example, whether the first brake application end position or the release end position or the respective coordinate was reached. The attaining of further brake application end positions outside the first permitted actuator motion range which can be input or determined in a similar fashion as the first brake application end position or coordinate (and which will be described hereinbelow) can also be indicated by way of the warning indicator.

The initial position (clearance position) of the brake linings or of the actuator can be established again during operation of the brake in dependence on the duration of operation. To this end, a position can be assumed with the actuator where the brake linings abut on the brake disc and/or the brake drum in a force-free manner. A corresponding actuator reference coordinate may then be assigned to this actuator reference position. In dependence on the brake lining wear, another actuator reference position may then be assumed operation-responsively, and an actuator reference coordinate can be adapted or assigned anew accordingly. The result is that brake lining wear can be determined from the reference coordinate. The control device 100 will then deliver a corresponding signal to the lining wear indicator 104 which informs the driver e.g. audibly and/or visually about brake lining wear. The clearance is then adjusted in dependence on the reference position or reference coordinate.

Figure 2:
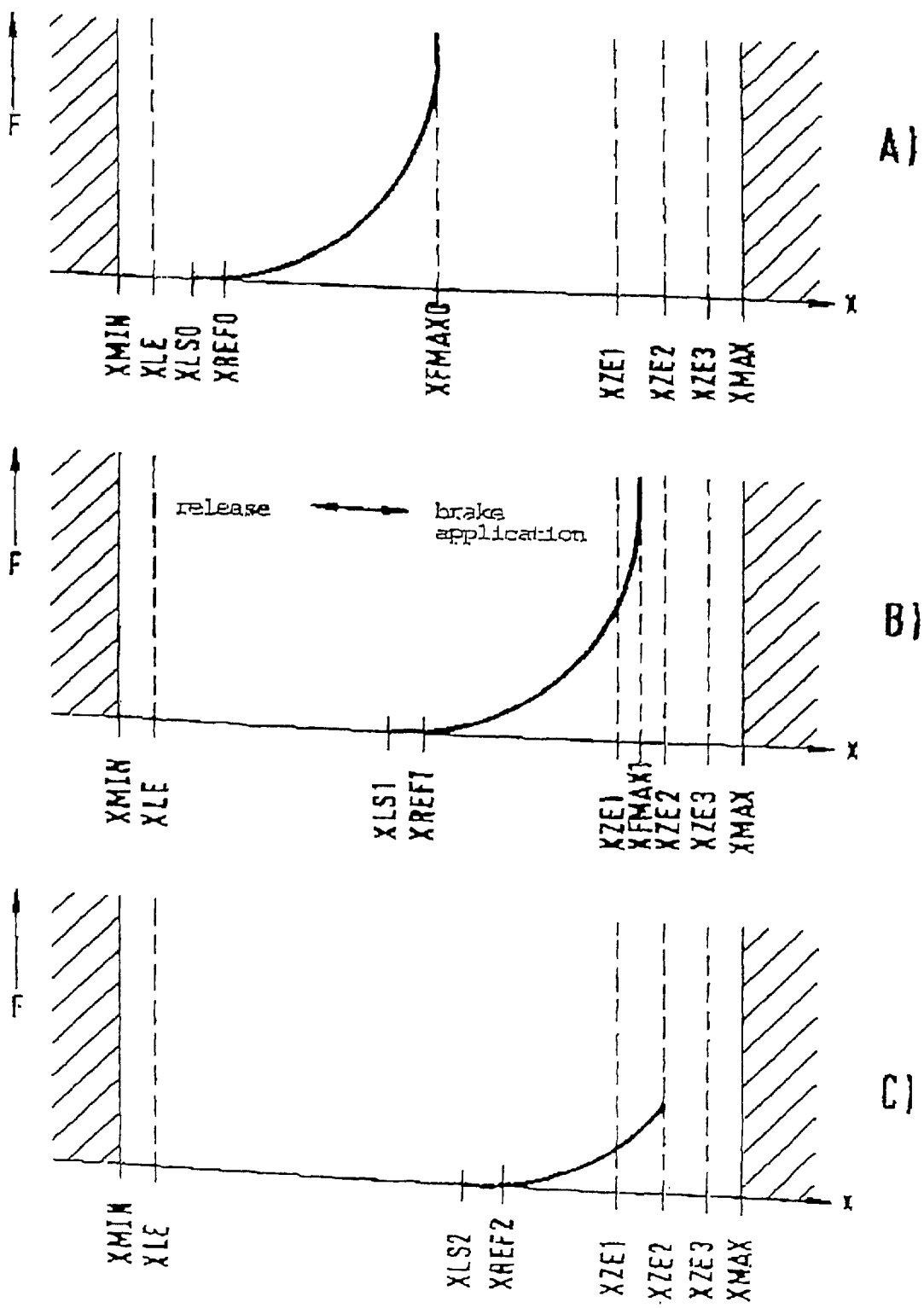
FIG. 2 shows exemplary variations of the brake actuation force with different brake lining wear.

Three exemplary diagrams with variations of the brake actuation force F as a function of the position x of the actuator are shown schematically in FIG. 2. A different reference position is respectively shown in each diagram. The reference position with new non-abraded brake linings XREF0 is referred to in FIG. 2A. The minimum position XMIN on the left-hand side in the diagram illustrates the mechanical stop of the actuator in the direction of release. The maximum position XMAX on the right-hand side in the diagram represents the position where e.g. the metal of the brake shoe would come to bear against the metal of the brake disc or brake drum in case the brake linings would have been worn completely. The minimum and maximum positions XMIN and XMAX represent the limits of the maximum possible mechanical actuator motion range. The position XLE designates the release end position which must not be exceeded by the actuator e.g. in the direction of release of the brake. The position XZE1 refers to the first brake application end position. The release end position and the brake application end position XLE and XZE1 enclose the first permitted actuator motion range within which the actuator is allowed to move. The position XLS0 represents the clearance position of the brake with brake linings not worn. When the brake is actuated until a maximum force, the result is the illustrated force variation. The latter ends in FIG. 2A with the maximum force in the maximum force position XFMAX0. The range between the reference position XREF0 and the maximum force position XFMAX0 represents the operating range of the brake, i.e., the range where compression of the brake linings is possible.

A reference position XREF1 is shown in FIG. 2B where the brake linings are worn to such an extent that replacement should be effected. This fact is indicated by the actuator exceeding the first brake application end position XZE1 with maximum brake actuation force. An alarm is sent to the driver when the first brake application end position XZE1 is reached in this embodiment. However, normal braking is still possible as can be seen in the force variation.

In FIG. 2C, the brake linings are worn to such an extent that the actuator reaches a second brake application end position XZE2 which must not be exceeded. However, to permit at least slight braking with this brake continuously, the actuator is maintained in this brake application end position XZE2, with the result that the maximum possible brake actuation force F is no longer reached. When the method is applied to both wheels of an axle, it is possible that the brake force is distributed differently onto the two wheels when the brake linings are differently worn. In this event, the control device 100 can be so configured as to control the brake force distribution of the two wheels so that the vehicle will not deviate from its track. It is possible that the brake is assisted by another hydraulic brake, for example. An alarm which is triggered when the first brake application end position XZE1 is reached may then be modified correspondingly to indicate when the second brake application end position XZE2 is reached. With the decrease of the brake actuation force, the actuator can also be moved correspondingly in the direction of release again, and the alarm can be indicated continuously and, possibly, can be indicated again also during restart of the vehicle.

The third brake application end position XZE3 shown in the diagrams, which is disposed on the right side of the second brake application end position XZE2 or can be equal to this position in another embodiment, represents that actuator position where the brake is deactivated e.g. simultaneously with the output of an alarm because the actuator has reached this position e.g. due to a malfunction. The second and third brake application end positions XZE2, XZE3, exactly as the release end position XLE and the first brake application end position XZE1, are established preferably in accordance with the maximum possible mechanical actuator motion range.

The diagrams of FIG. 2 are schematic views showing only one embodiment of several. The reference position with non-abraded linings XREF0 can be assumed, for example, as an exchange position for replacement of a brake lining. Any other appropriate position is, however, also possible. The corresponding actuator exchange coordinate can then be determined and stored e.g. in the control device 100. The illustrated diagrams can also be regarded as a representation of the force variations in dependence on the corresponding coordinates. Then, the illustrated quantities x, etc., should be considered as coordinates or counter values.

FIG. 3 shows as an example the sequence in an embodiment of the method of the present invention where initially the actuator position is assumed in step 300. A polling is made in step 301 whether the actuator reference position has already been reached. If this is not the case, the actuator reference position is continuously assumed in step 300. When the actuator reference position is reached, the related actuator reference coordinate is determined in step 302. Subsequently, the permitted actuator motion ranges inclusive the release end position and the first to third brake application end positions are established in step 303. Now the actuator actual coordinate corresponding to the current position of the actuator can be determined for the actual operation of the brake.

Following is step 305 in FIG. 3B where a polling is performed as to whether the release end coordinate in the direction of release was reached by the actuator actual coordinate. If this is the case, a corresponding alarm is output in step 306 and a release motion of the actuator is terminated in step 307. If the release end coordinate is not reached, a polling is performed in step 308 whether the first brake application end coordinate in the direction of brake application was reached by the actuator actual coordinate. If this is not the case, the process is continued in step 304. When the polling is affirmed, a corresponding alarm is output in step 309 and, thereafter, a polling is performed in step 310 whether the second brake application end coordinate in the direction of brake application was also reached by the actuator actual coordinate. If this is not the case, the process is continued in step 304.

When the polling in step 310 of FIG. 3B is affirmed, the process is continued in step 311 of FIG. 3C. There, the actuator is maintained in the second brake application end position and a polling is performed in step 312 whether the actuator actual coordinate contrary to step 311 has reached the third brake application end coordinate in the direction of brake application. In the negative, the process is continued in step 304. When the result of polling is positive, a corresponding alarm is output in step 313, and in step 314 the brake is deactivated and the process terminated. Subsequently, a primary control such as an ESP control could take care of the further brake operation, for example.

Steps to determine and indicate lining wear are listed in FIG. 4. The actuator reference position is assumed in step 400. The associated reference coordinate is thereafter stored in step 401. This includes a previous determination of the reference coordinate with the actuator actual coordinate. Subsequently, lining wear as a function of the reference coordinate is established in step 402. Lining wear or a related quantity is indicated or advised audibly and/or visually to the driver in step 403.

The steps illustrated in FIG. 4 can be performed in different points of FIG. 3. However, this action should not be conducted when the brake is released in order to prevent interruption of the brake operation. Besides, the steps of FIG. 4 can be repeated in case of need, and adjustment of the clearance can follow directly so that the brake can adopt a correct initial position. Implementation could be such that in case one or more conditions are satisfied, the method steps 400 to 403 are performed before step 304 in FIG. 3A.

For brake lining replacement, an operating element (such as a switch) to be actuated by the driver can be provided in the vehicle interior. Subsequently, the actuator will automatically adopt the replacement position. When lining replacement is completed, the switch can be actuated again or released again, which may then have as a result e.g. a new initialization of the reference position or determination of the reference coordinate. The actuator can then adopt the clearance position, whereby the brake would be ready for operation again.

What is claimed is:

1. Method of monitoring the motion of an actuator of a vehicle brake, including the steps of:
    establishing an actuator reference coordinate related to a predetermined actuator reference position,
    determining an actuator actual coordinate in accordance with the actuator reference coordinate and in accordance with the motion of the actuator,
    establishing a first permitted actuator motion range from a permitted release end coordinate of the actuator for releasing the brake and a first permitted brake application end coordinate of the actuator for application of the brake in accordance with the actuator reference coordinate, and
    outputting a signal when the actuator actual coordinate lies outside the first permitted actuator motion range,
    establishing a second permitted actuator motion range from the permitted release end position and a second permitted brake application end position, wherein the first actuator motion range lies within the second actuator motion range or is equal to it.

2. Method as claimed in claim 1, wherein the step for determining the actuator actual coordinate further includes identification of the direction of motion of the actuator.

3. Method as claimed in claim 1, further including outputting an alarm whenever the actuator actual coordinate in the direction of brake application exceeds the first brake application end coordinate.

4. Method as claimed in claim 1, wherein an alarm is output to the driver whenever the actuator actual coordinate in the direction of release exceeds the release end coordinate.

5. Method as claimed in claim 1, wherein the actuator is driven electrically.

6. Method as claimed in claim 1, wherein the step of establishing the actuator reference coordinate further includes moving the actuator to adopt the actuator reference position and identifying that the actuator reference position is reached by the actuator.

7. Method as claimed in claim 6, wherein the actuator reference position is predetermined by the position of a switching sensor which outputs a corresponding switch signal for detecting that the actuator reference position is reached when the actuator has reached this position.

8. Method as claimed in claim 1, wherein an absolute reference position is predetermined by one of the limits of the maximum possible mechanical actuator motion range.

9. Method as claimed in claim 8, wherein the step of establishing the actuator reference coordinate further includes detecting an engine current that drives the actuator in order to detect that the actuator has reached the actuator reference position.

10. Method as claimed in claim 1, wherein the actuator actual coordinate or the direction of movement of the actuator are determined or detected by using an incremental position measuring system with relative measurement.

11. Method as claimed in claim 1, wherein the step of determining an actuator reference coordinate includes determining, repeatedly said actuator reference coordinate for an actuator position in which the brake linings bear against the brake disc or the brake drum in a force-free manner.

12. Method as claimed in claim 11, wherein the brake lining wear is determined in accordance with the actuator reference coordinate.

13. Method as claimed in claim 12, wherein a quantity corresponding to the brake lining wear is transmitted to the driver auditively or visually.

14. Method as claimed in claim 11, wherein the lining clearance is adjusted in accordance with the actuator reference coordinate.

15. Method as claimed in claim 11, further including the step of establishing an actuator exchange coordinate in accordance with the corresponding actuator reference coordinate which is determined when the brake linings are not worn, and the associated actuator exchange position is assumed when a brake lining shall be replaced.

16. Method as claimed in claim 1, wherein the first or the second permitted actuator motion range is established in accordance with the maximum possible mechanical actuator motion range.

17. Method as claimed in claim 1, wherein when the actuator actual coordinate in the direction of brake application reaches the second brake application end coordinate, the actuator is retained in the associated brake application end position until the brake is released.

18. Method as claimed in claim 1, further including the step of deactivating the brake or activating an alarm when the actuator actual coordinate in the direction of brake application reaches a third brake application end coordinate which, in the direction of brake application, lies outside the second actuator motion range or is equal to the second brake application end coordinate.

19. Method as claimed in claim 17, further including applying simultaneously to two wheel brakes of the same axle, the brake force distribution of the two wheels such that the vehicle does not deviate from its track.

* * * * *